US011702138B2

(12) United States Patent
Yasuda et al.

(10) Patent No.: US 11,702,138 B2
(45) Date of Patent: Jul. 18, 2023

(54) METHOD FOR LATERAL CONTROL ASSISTANCE TO ENABLE ONE-HANDED DRIVING OF A VEHICLE

(71) Applicant: TOYOTA RESEARCH INSTITUTE, INC., Los Altos, CA (US)

(72) Inventors: Hiroshi Yasuda, San Francisco, CA (US); Manuel Ludwig Kuehner, Mountain View, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 68 days.

(21) Appl. No.: 17/328,338

(22) Filed: May 24, 2021

(65) Prior Publication Data

US 2022/0371660 A1 Nov. 24, 2022

(51) Int. Cl.
*B62D 15/02* (2006.01)
*B62D 1/04* (2006.01)

(52) U.S. Cl.
CPC ........... *B62D 15/025* (2013.01); *B62D 1/04* (2013.01)

(58) Field of Classification Search
CPC ............................... B62D 15/025; B62D 1/04
See application file for complete search history.

(56) References Cited

U.S. PATENT DOCUMENTS

| | | | |
|---|---|---|---|
| 9,037,348 B2 * | 5/2015 | Gunia | B62D 6/00 701/41 |
| 9,248,851 B2 | 2/2016 | Van'Tzelfde et al. | |
| 10,128,696 B2 * | 11/2018 | Iwasaki | H02J 50/60 |
| 10,155,531 B2 * | 12/2018 | Champagne | B62D 6/001 |
| 10,773,750 B2 | 9/2020 | Rafaila et al. | |
| 10,926,786 B2 * | 2/2021 | Jendrowski | B60K 35/00 |
| 11,094,080 B2 * | 8/2021 | Schiebener | G06T 7/74 |
| 11,453,433 B2 * | 9/2022 | Moulaire | B62D 5/0463 |
| 11,455,744 B2 * | 9/2022 | Yasuda | G06T 7/73 |
| 2011/0133919 A1 * | 6/2011 | Evarts | B62D 1/046 340/439 |
| 2012/0096980 A1 * | 4/2012 | Schramm | B62D 15/025 74/552 |
| 2012/0296528 A1 | 11/2012 | Wellhoefer et al. | |
| 2016/0185356 A1 | 6/2016 | Di Censo et al. | |
| 2016/0347348 A1 * | 12/2016 | Lubischer | G05D 1/0088 |
| 2017/0106903 A1 * | 4/2017 | Moretti | B62D 15/025 |
| 2017/0355367 A1 * | 12/2017 | Fu | B60W 30/12 |
| 2019/0337518 A1 * | 11/2019 | Burow | B60K 28/16 |
| 2020/0164921 A1 * | 5/2020 | Augst | B62D 15/025 |
| 2020/0377116 A1 * | 12/2020 | Abrashov | B62D 15/0295 |
| 2021/0107527 A1 * | 4/2021 | Karve | B60W 40/08 |
| 2021/0171093 A1 * | 6/2021 | Wang | B62D 15/025 |
| 2021/0188344 A1 * | 6/2021 | Moulaire | B62D 5/0463 |
| 2021/0309292 A1 * | 10/2021 | Suzuki | B62D 6/002 |

* cited by examiner

*Primary Examiner* — Peter D Nolan
*Assistant Examiner* — Wae L Louie
(74) *Attorney, Agent, or Firm* — Seyfarth Shaw LLP

(57) ABSTRACT

A method for providing lane keeping support to enable improved one-hand operation of a vehicle is described. The method includes detecting a one-hand location of a vehicle operator on a steering wheel of the vehicle. The method also includes determining a level of control of the vehicle operator on the steering wheel during the one-hand operation of the vehicle. The method further includes adjusting a level of compensation applied to the steering wheel to facilitate the one-hand operation of the vehicle.

20 Claims, 6 Drawing Sheets

METHOD FOR LATERAL CONTROL ASSISTANCE TO ENABLE ONE-HANDED DRIVING OF A VEHICLE

BACKGROUND

Field

Certain aspects of the present disclosure generally relate to vehicle assistance technology and, more particularly, to lateral assistance for enabling one-handed driving of a vehicle.

Background

Autonomous agents (e.g., vehicles, robots, etc.) rely on machine vision for sensing a surrounding environment by analyzing areas of interest in a scene from images of the surrounding environment. Autonomous agents, such as driverless cars and robots, are quickly evolving and have become a reality in this decade. The National Highway Traffic Safety Administration ("NHTSA") has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number.

These different levels of autonomous vehicles may provide a safety system that improves driving of a vehicle. For example, in a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle. The set of ADAS features installed in the autonomous vehicle may be a lane centering assistance system and/or a lane departure warning system.

ADAS features such as lane change assist (LCA) systems as well as lane keeping support (LKS) systems provide torque to the steering wheel of a vehicle for providing guidance to the vehicle operator. Unfortunately, the torque provided to the steering wheel is generally inappropriate for one-handed operation of the vehicle.

SUMMARY

A method for providing lane keeping support to enable improved one-hand operation of a vehicle is described. The method includes detecting a one-hand location of a vehicle operator on a steering wheel of the vehicle. The method also includes determining a level of control of the vehicle operator on the steering wheel during the one-hand operation of the vehicle. The method further includes adjusting a level of compensation applied to the steering wheel to facilitate the one-hand operation of the vehicle.

A non-transitory computer-readable medium having program code recorded thereon for providing lane keeping support to enable improved one-hand operation of a vehicle is described. The program code is executed by a processor. The non-transitory computer-readable medium includes program code to detect a one-hand location of a vehicle operator on a steering wheel of the vehicle. The non-transitory computer-readable medium also includes program code to determine a level of control of the vehicle operator on the steering wheel during the one-hand operation of the vehicle. The non-transitory computer-readable medium further includes program code to adjust a level of compensation applied to the steering wheel to facilitate the one-hand operation of the vehicle.

A system for providing lane keeping support to enable improved one-hand operation of a vehicle is described. The system includes a one-hand operation detection module to detect a one-hand location of a vehicle operator on a steering wheel of the vehicle. The system also includes a vehicle control level module to determine a level of control of the vehicle operator on the steering wheel during the one-hand operation of the vehicle. The system further includes a steering compensation adjustment module to adjust a level of compensation applied to the steering wheel to facilitate the one-hand operation of the vehicle.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
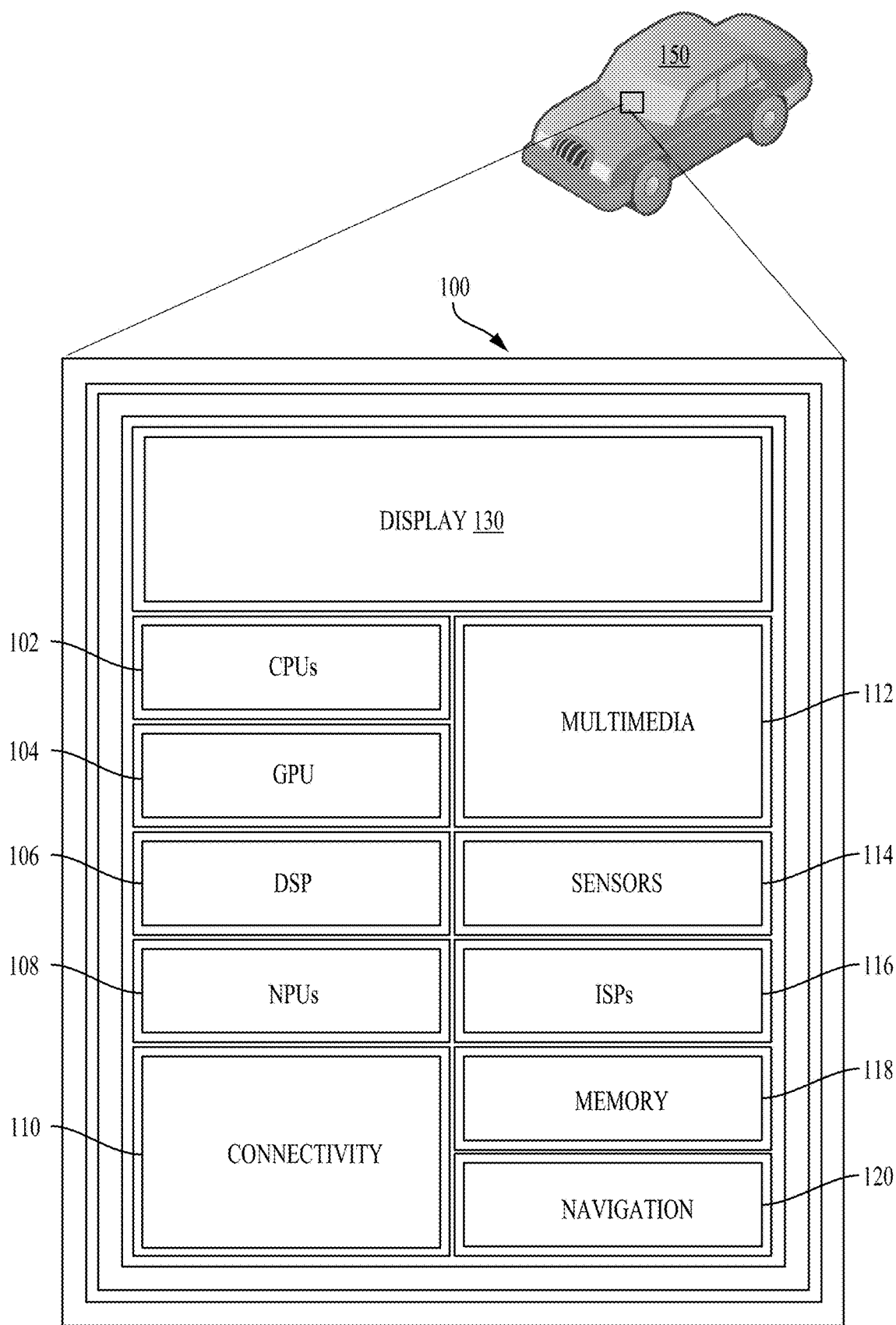
FIG. 1 illustrates an example implementation of designing a neural network using a system-on-a-chip (SOC) for a vehicle safety system, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Traffic congestion on highways affects millions of people and presents an urgent problem to solve. In particular, vehicles may swerve in their lanes and temporarily enter adjacent lanes, which may generate traffic oscillations and extra congestion. Highways are potentially congested due to distracted drivers and unexpected braking maneuvers of surrounding vehicles. Advanced driver assistance systems (ADAS) for vehicles are expected to reduce traffic accidents and improve traffic efficiency. In addition, automation of vehicle control on highways is rapidly advancing, which may eventually reduce traffic accidents and improve traffic efficiency.

Reducing traffic congestion may be achieved by effectively warning distracted drivers of vehicles traveling on highways. For example, a set of ADAS features installed in a non-autonomous vehicle may include a lane centering assistance system and/or a lane departure warning system. ADAS features such as lane keeping support (LKS) systems provide torque to the steering wheel of a vehicle for providing guidance to the vehicle operator. Unfortunately, the torque provided to the steering wheel is generally inappropriate for one-handed operation of the vehicle.

Aspects of the present disclosure facilitate one-handed operation of a vehicle. These aspects of the present disclosure enable one-handed vehicle operation by modulating a steering wheel to compensate for the physical limitations of the one-handed vehicle operation. In some aspects of the present disclosure, a lateral control assistance system utilizes hand status sensors and lateral control assist/steering torque gain change modules to assist in the one-handed operation of a vehicle. The hand status sensors may be a camera, touch sensor, or other like device to determine the number and position of the operator's hands on the steering wheel. The lateral control assist module may be a lane change assist system, a lane departure warning system, or other like ADAS module.

In some aspects of the present disclosure, a lane keeping support system adjusts a steering assistance level when the driver is holding the steering wheel with only one hand. In these aspects of the present disclosure, a steering torque gain change module may change the threshold for the lane keeping support system to activate earlier than when the vehicle operator is using both hands. For example, the steering torque gain change module may increase the steering torque gain for the direction that is harder to rotate for the hand in use to operate the vehicle. In this example, if the left hand is on the wheel, the steering torque gain change module increases the torque gain for rotating the steering wheel in a counter-clockwise direction.

In other aspects of the present disclosure, the steering torque gain change module cancels the torque naturally applied to the steering wheel due to resting of only one hand on the steering wheel. This naturally occurring torque may be canceled by applying a counter torque (e.g., a clockwise torque or a counter-clockwise torque) to help sustain the one-handed position. For example, resting the left hand at the 9 o'clock position on the steering wheel will naturally tend to rotate the steering wheel counter-clockwise so that the left hand will be at the 6 o'clock position. This forces the user to apply a counter torque to keep the steering wheel in the proper orientation so the hand can remain in the 9 o'clock position.

In these aspects of the present disclosure, the lateral control assistance system applies a counter torque for the user so that the user may comfortably rest the user's hand without rotating the steering wheel. For example, a user driving with the user's left hand may naturally turn right for a right hand turn, but may be impaired when turning left for a left hand turn because of the body's limited ability to rotate the arm in that direction without letting go of the steering wheel. To compensate, the steering wheel may read the right turn input as it would normally, but would apply additional torque (i.e., increase gain) on the steering wheel during left turns to allow for a similar turn radius with the limited ability to turn the steering wheel.

FIG. 1 illustrates an example implementation of the aforementioned system and method for a vehicle safety system using a system-on-a-chip (SOC) 100 of a vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fifth generation (5G) cellular network technology, fourth generation long term evolution (4G LTE) connectivity, unlicensed WiFi connectivity, USB connectivity, Bluetooth® connectivity, and the like. In addition, a multimedia processor 112 in combination with a display 130 may, for example, apply a temporal component of a current traffic state to select a vehicle safety action, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the vehicle 150. In this arrangement, the vehicle 150 may include a processor and other features of the SOC 100. In this aspect of the present disclosure, instructions loaded into a processor (e.g., CPU 102) or the NPU 108 of the vehicle 150 may include program code to determine one or more merge gaps between vehicles in a target lane of a multilane highway based on images processed by the sensor processor 114. The instructions loaded into a processor (e.g., CPU 102) may also include program code to compute an exposure time in which the ego vehicle is specified to merge into the one or merge gaps, and program code to select a merge gap between a first vehicle and a second vehicle in the target lane of the multilane highway having a maximum exposure time.

Figure 2:
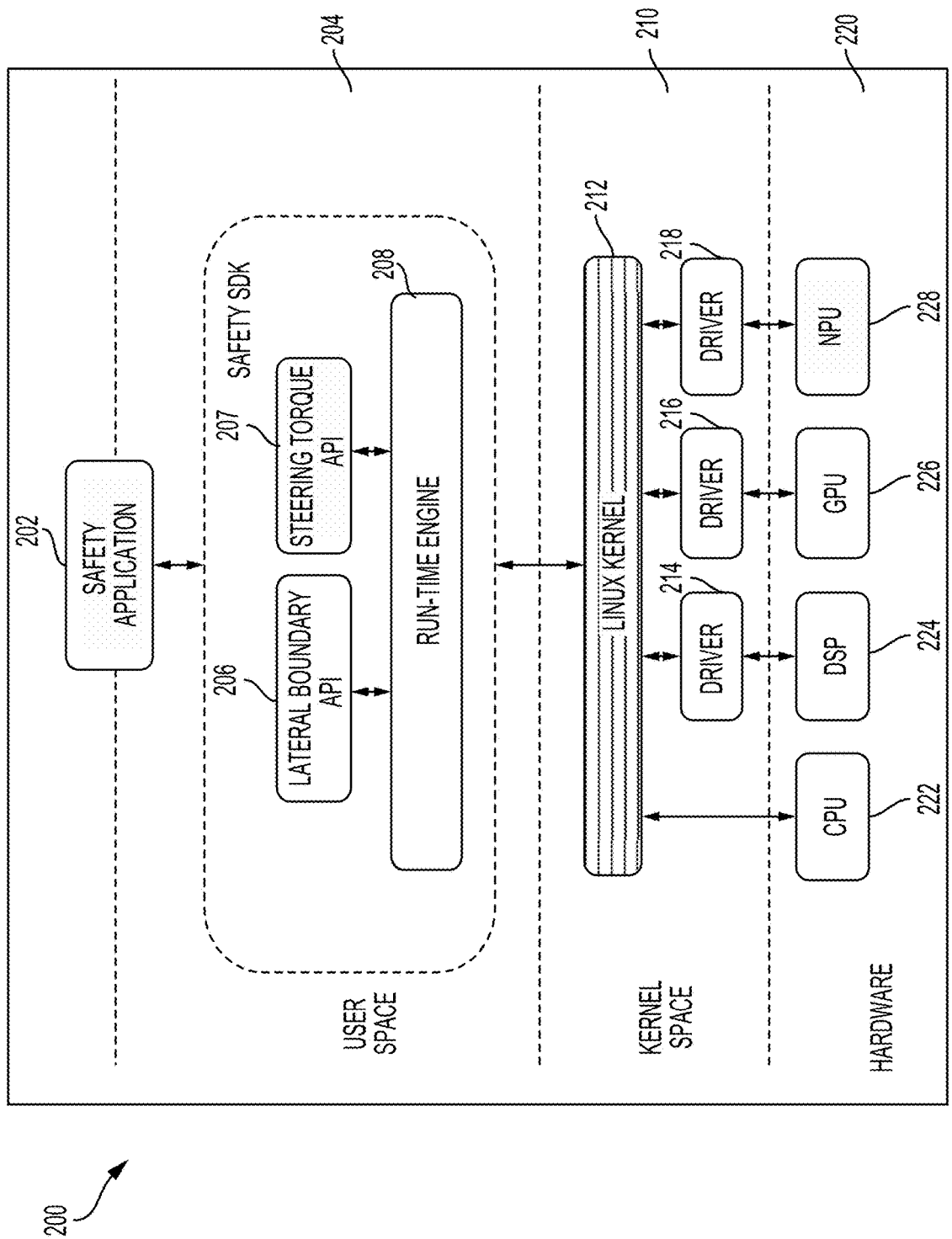
FIG. 2 is a block diagram illustrating a software architecture that may modularize artificial intelligence (AI) functions for a vehicle safety system of an autonomous agent, according to aspects of the present disclosure.

FIG. 2 is a block diagram illustrating a software architecture 200 that may modularize artificial intelligence (AI) functions for vehicle safety, according to aspects of the present disclosure. Using the architecture, a safety application 202 may be designed such that it may cause various processing blocks of a system-on-a-chip (SOC) 220 (for example a CPU 222, a DSP 224, a GPU 226, and/or an NPU 228) to perform supporting computations during run-time operation of the safety application 202. While FIG. 2 describes the software architecture 200 for operating a vehicle safety system, it should be recognized that vehicle safety system functionality is not limited to autonomous agents. According to aspects of the present disclosure, a vehicle safety system is applicable to any vehicle type, provided the vehicle is equipped with appropriate functions of an advanced driver assistance system (ADAS).

The safety application 202 may be configured to call functions defined in a user space 204 that may, for example, provide for vehicle safety services. The safety application 202 may make a request to compile program code associated with a library defined in a lateral boundary application programming interface (API) 206 to help maintain a vehicle between lane boundaries during single-handed vehicle operation. The safety application 202 may also make a request to compile program code associated with a library defined in a steering torque API 207 to adjust a steering assistance level when the driver is holding the steering wheel with only one hand.

A run-time engine 208, which may be compiled code of a runtime framework, may be further accessible to the safety application 202. The safety application 202 may cause the run-time engine 208, for example, to take actions for communicating with a vehicle driver. When the vehicle begins to wander within a traffic lane, the run-time engine 208 may in turn send a signal to an operating system 210, such as a Linux Kernel 212, running on the SOC 220. FIG. 2 illustrates the Linux Kernel 212 as software architecture for implementing safety features of the vehicle. It should be recognized, however, aspects of the present disclosure are not limited to this exemplary software architecture. For example, other kernels may be used to provide the software architecture to support single-handed vehicle operation assistance functionality.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
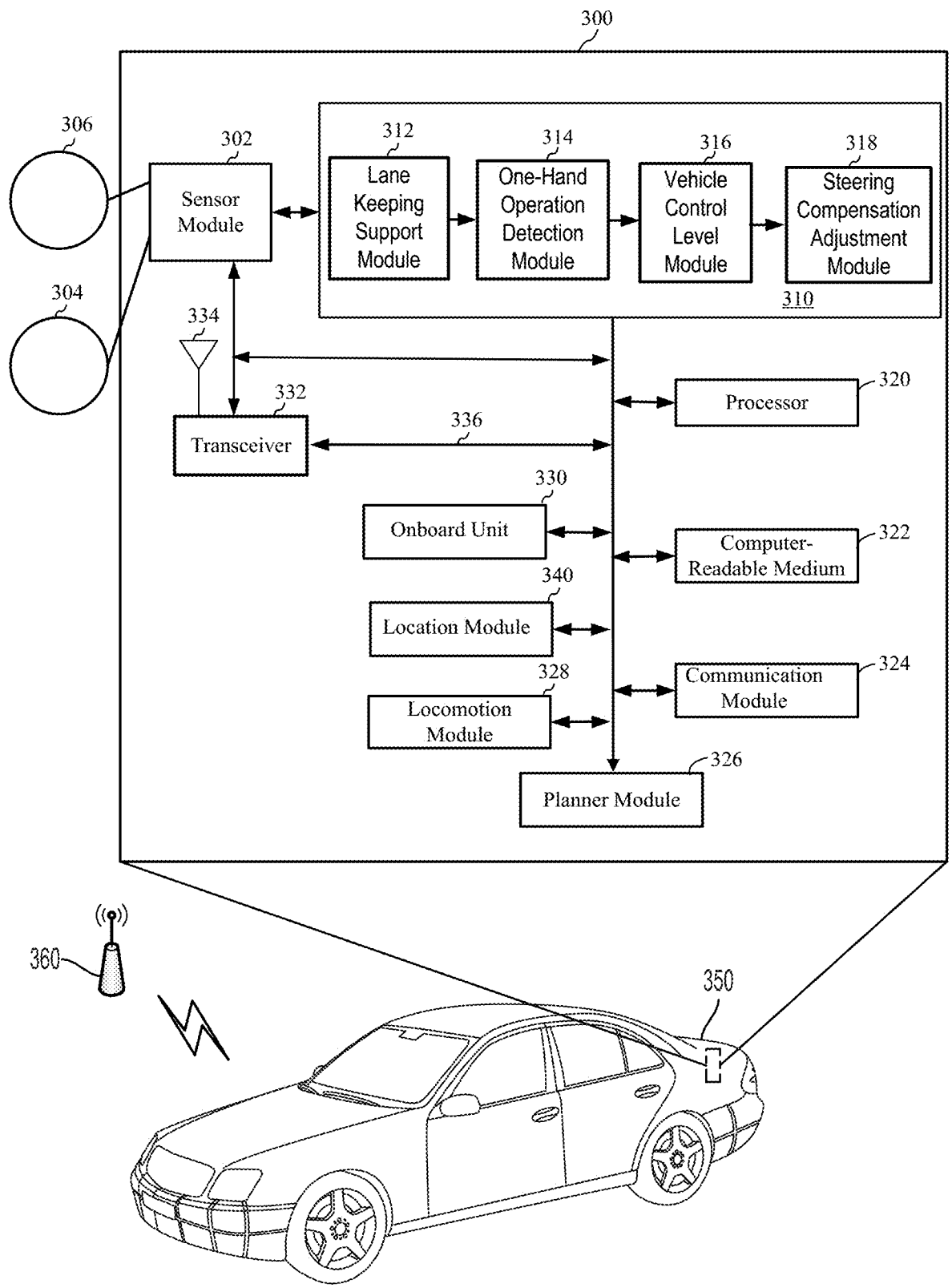
FIG. 3 is a diagram illustrating an example of a hardware implementation for a vehicle safety system, according to aspects of the present disclosure.

FIG. 3 is a diagram illustrating an example of a hardware implementation for a vehicle safety system 300, according to aspects of the present disclosure. The vehicle safety system 300 may be configured for improved driving safety of a car 350. The vehicle safety system 300 may be a component of a vehicle, a robotic device, or other non-autonomous device (e.g., non-autonomous vehicles). For example, as shown in FIG. 3, the vehicle safety system 300 is a component of a car 350.

Aspects of the present disclosure are not limited to the vehicle safety system 300 being a component of the car 350. Other devices, such as a bus, motorcycle, or other like non-autonomous vehicle, are also contemplated for implementing the vehicle safety system 300. In this example, the car 350 may be autonomous or semi-autonomous; however, other configurations for the car 350 are contemplated, such as an advanced driver assistance system (ADAS).

The vehicle safety system 300 may be implemented with an interconnected architecture, represented generally by an interconnect 336. The interconnect 336 may include any number of point-to-point interconnects, buses, and/or bridges depending on the specific application of the vehicle safety system 300 and the overall design constraints. The interconnect 336 links together various circuits including one or more processors and/or hardware modules, represented by a sensor module 302, a vehicle safety controller 310, a processor 320, a computer-readable medium 322, a communication module 324, a planner module 326, a locomotion module 328, an onboard unit 330, and a location module 340. The interconnect 336 may also link various other circuits such as timing sources, peripherals, voltage regulators, and power management circuits, which are well known in the art, and therefore, will not be described any further.

The vehicle safety system 300 includes a transceiver 332 coupled to the sensor module 302, the vehicle safety controller 310, the processor 320, the computer-readable medium 322, the communication module 324, the planner module 326, the locomotion module 328, the location module 340, and the onboard unit 330. The transceiver 332 is coupled to antenna 334. The transceiver 332 communicates with various other devices over a transmission medium. For example, the transceiver 332 may receive commands via transmissions from a user or a connected vehicle. In this example, the transceiver 332 may receive/transmit vehicle-to-vehicle traffic state information for the vehicle safety controller 310 to/from connected vehicles within the vicinity of the car 350.

The vehicle safety system 300 includes the processor 320 coupled to the computer-readable medium 322. The processor 320 performs processing, including the execution of software stored on the computer-readable medium 322 to provide functionality according to the disclosure. The software, when executed by the processor 320, causes the vehicle safety system 300 to perform the various functions described for vehicle safety of the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain measurements via different sensors, such as a first sensor 306 and a second sensor 304. The first sensor 306 may be a vision sensor (e.g., a stereoscopic camera or a red-green-blue (RGB) camera) for capturing 2D images. The second sensor 304 may be a ranging sensor, such as a light detection and ranging (LiDAR) sensor or a radio detection and ranging (RADAR) sensor. Of course, aspects of the present disclosure are not limited to the aforementioned sensors as other types of sensors (e.g., thermal, sonar, and/or lasers) are also contemplated for either of the first sensor 306 or the second sensor 304.

The measurements of the first sensor 306 and the second sensor 304 may be processed by the processor 320, the sensor module 302, the vehicle safety controller 310, the communication module 324, the planner module 326, the locomotion module 328, the onboard unit 330, and/or the location module 340. In conjunction with the computer-readable medium 322, the measurements of the first sensor 306 and the second sensor 304 are processed to implement the functionality described herein. In one configuration, the data captured by the first sensor 306 and the second sensor 304 may be transmitted to a connected vehicle via the transceiver 332. The first sensor 306 and the second sensor 304 may be coupled to the car 350 or may be in communication with the car 350.

The location module 340 may determine a location of the car 350. For example, the location module 340 may use a global positioning system (GPS) to determine the location of the car 350. The location module 340 may implement a dedicated short-range communication (DSRC)-compliant GPS unit. A DSRC-compliant GPS unit includes hardware and software to make the car 350 and/or the location module 340 compliant with one or more of the following DSRC standards, including any derivative or fork thereof: EN 12253:2004 Dedicated Short-Range Communication-Physical layer using microwave at 5.8 GHz (review); EN 12795: 2002 Dedicated Short-Range Communication (DSRC)-DSRC Data link layer: Medium Access and Logical Link Control (review); EN 12834:2002 Dedicated Short-Range Communication-Application layer (review); EN 13372: 2004 Dedicated Short-Range Communication (DSRC)-DSRC profiles for RTTT applications (review); and EN ISO 14906:2004 Electronic Fee Collection-Application interface.

The communication module 324 may facilitate communications via the transceiver 332. For example, the communication module 324 may be configured to provide communication capabilities via different wireless protocols, such as 5G, WiFi, long term evolution (LTE), 4G, 3G, etc. The communication module 324 may also communicate with other components of the car 350 that are not modules of the vehicle safety system 300. The transceiver 332 may be a communications channel through a network access point 360. The communications channel may include DSRC, LTE, LTE-D2D, mmWave, WiFi (infrastructure mode), WiFi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communications, mmWave, WiFi (infrastructure mode), WiFi (ad-hoc mode), visible light communication, TV white space communication, and satellite communication. The network access point 360 may also include a mobile data network that may include 3G, 4G, 5G, LTE, LTE-V2X, LTE-D2D, VoLTE, or any other mobile data network or combination of mobile data networks. Further, the network access point 360 may include one or more IEEE 802.11 wireless networks.

The vehicle safety system 300 also includes the planner module 326 for planning a route and controlling the locomotion of the car 350, via the locomotion module 328 for autonomous operation of the car 350. In one configuration, the planner module 326 may override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration ("NHTSA") has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control ("ACC"); parking assistance with automated steering; and lane keeping assistance ("LKA") type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but is still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle ("HAV") is an autonomous vehicle that is Level 3 or higher. Accordingly, in some configurations the car 350 is one of the following: a Level 1 autonomous vehicle; a Level 2 autonomous vehicle; a Level 3 autonomous vehicle; a Level 4 autonomous vehicle; a Level 5 autonomous vehicle; and an HAV.

The vehicle safety controller 310 may be in communication with the sensor module 302, the processor 320, the computer-readable medium 322, the communication module 324, the planner module 326, the locomotion module 328, the location module 340, the onboard unit 330, and the transceiver 332. In one configuration, the vehicle safety controller 310 receives sensor data from the sensor module 302. The sensor module 302 may receive the sensor data from the first sensor 306 and the second sensor 304. According to aspects of the disclosure, the sensor module 302 may filter the data to remove noise, encode the data, decode the data, merge the data, extract frames, or perform other functions. In an alternate configuration, the vehicle safety controller 310 may receive sensor data directly from the first sensor 306 and the second sensor 304 to determine, for example, input traffic data images.

One-handed vehicle operation is common because it is more comfortable than having two hands on a steering wheel and becoming more prevalent as vehicle operators begin relying more heavily on advanced driver assistance systems (ADAS). Unfortunately, one-handed operation is generally less stable and makes it difficult to conduct evasive vehicle maneuvers. In particular, one-handed vehicle operation limits the vehicle operator's ability to make certain turns. ADAS features such as lane change assist (LCA) systems as well as lane keeping support (LKS) systems provide torque to the steering wheel of a vehicle (e.g., the car 350) to guide the vehicle operator. Unfortunately, the torque provided to the steering wheel is generally inappropriate for one-handed vehicle operation.

Aspects of the present disclosure are directed to the vehicle safety system 300 configured to facilitate one-handed operation of a vehicle, such as the car 350. In some aspects of the present disclosure, the vehicle safety system 300 includes the vehicle safety controller 310 to enable one-handed vehicle operation. For example, the vehicle safety system 300 enables one-handed vehicle operation by modulating a steering wheel of the car 350 to compensate for the physical limitations of the one-handed vehicle operation.

As shown in FIG. 3, the vehicle safety controller 310 includes a lane keeping support module 312, a one-hand operation detection module 314, a vehicle control level module 316, and a steering compensation adjustment module 318. The lane keeping support module 312, the one-hand operation detection module 314, the vehicle control level module 316, and the steering compensation adjustment module 318 may be components of a same or different artificial neural network, such as a deep convolutional neural network (CNN). The vehicle safety controller 310 is not limited to a CNN. The vehicle safety controller 310 receives a data stream from the first sensor 306 and/or the second sensor 304. The data stream may include a 2D RGB image from the first sensor 306 and LIDAR data points from the second sensor 304. The data stream may include multiple frames, such as image frames of traffic data. The first sensor 306 or the second sensor 304 may be hand status sensors on the steering wheel of the car 350.

In some aspects of the present disclosure, the lane keeping support module 312 modifies a steering torque gain change module to assist in the one-handed operation of the car 350. For example, the hand status sensors enable the one-hand operation detection module 314 to detect one-handed operation of the car 350. The hand status sensors may be a camera, touch sensor, or other like device to determine the number and position of the vehicle operator's hands on the steering wheel of the car. The lane keeping support module 312 may be a lane departure warning system, or other like ADAS module.

In some aspects of the present disclosure, the lane keeping support module 312 adjusts a steering torque gain level when the one-hand operation detection module 314 detects the driver is holding the steering wheel with only one hand. In these aspects of the present disclosure, the steering compensation adjustment module 318 may change the threshold for the lane keeping support system to activate earlier than when the vehicle operator is using both hands. For example, the steering compensation adjustment module may increase the steering torque gain for the direction that is harder to rotate for the hand in use to operate the car 350 according to the vehicle control level module 316. In this example, if the left hand is on the steering wheel, the steering compensation adjustment module 318 increases the gain for rotating the steering wheel in a counter-clockwise direction.

Figure 4:
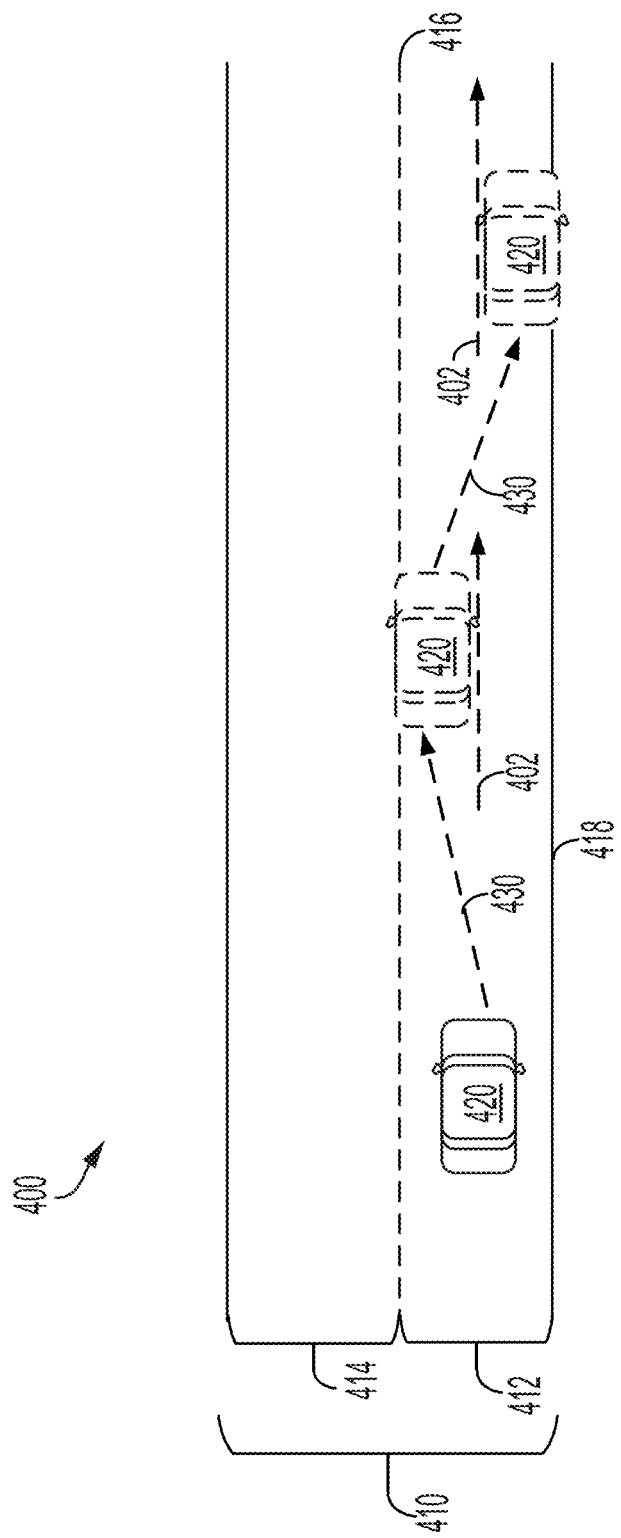
FIG. 4 is a diagram illustrating an overview of a roadway environment, including a swerving vehicle in a first lane of a roadway, according to aspects of the present disclosure.

FIG. 4 is a diagram illustrating an overview of a roadway environment, including a swerving vehicle in a first lane of a roadway, according to aspects of the present disclosure. For example, a roadway environment 400 includes a roadway 410, having a first lane 412 in which a vehicle 420 is traveling and a second lane 414. In this example, the vehicle 420 is swerving in the first lane 412 as shown by a trajectory 430. In these aspects of the present disclosure, the vehicle 420 is configured to monitor a position of the vehicle relative to the boundaries of the first lane 412, as well as a center line 402 of the first lane 412 of the roadway 410. In this example, the vehicle 420, may be the car 350, shown in FIG. 3.

In one aspect of the present disclosure, safe operation of the vehicle 420 is enhanced by a safety controller (e.g., the vehicle safety controller 310 of FIG. 3). For example, the vehicle 420 (e.g., using the lane keeping support module 312 of FIG. 3) identifies a dashed center line between the first lane 412 and the second lane 414 of the roadway 410 as a first lateral boundary 416 (e.g., a left edge) of the first lane 412. The vehicle 420 also identifies a right edge of the first lane 412 as a second lateral boundary 418 of the first lane 412 of the roadway 410. In addition, the vehicle 420 identifies a center line 402 of the first lane 412.

According to aspects of the present disclosure, a vehicle safety system (e.g., the vehicle safety system 300) of the vehicle 420 is configured to provide varying amounts of lateral torque (e.g., on the left and right side) to a steering wheel of the vehicle 420 to guide the operator. Unfortunately, the torque provided to the steering wheel is generally inappropriate for one-handed operation of the vehicle 420. Some aspects of the present disclosure describe a method to facilitate one-handed operation of the vehicle 420. In these aspects of the present disclosure, hand status sensors on the steering wheel of the vehicle 420 identify a location of the operator's hands from which the vehicle 420 can identify how to adjust a steering control assistance. For example, in the context of lane keeping assistance (LKS) systems, the vehicle 420 may change thresholds to activate earlier, and/or increase steering torque gain for a direction that is harder to control when using one hand, for example, as shown in FIG. 5.

Figure 5:
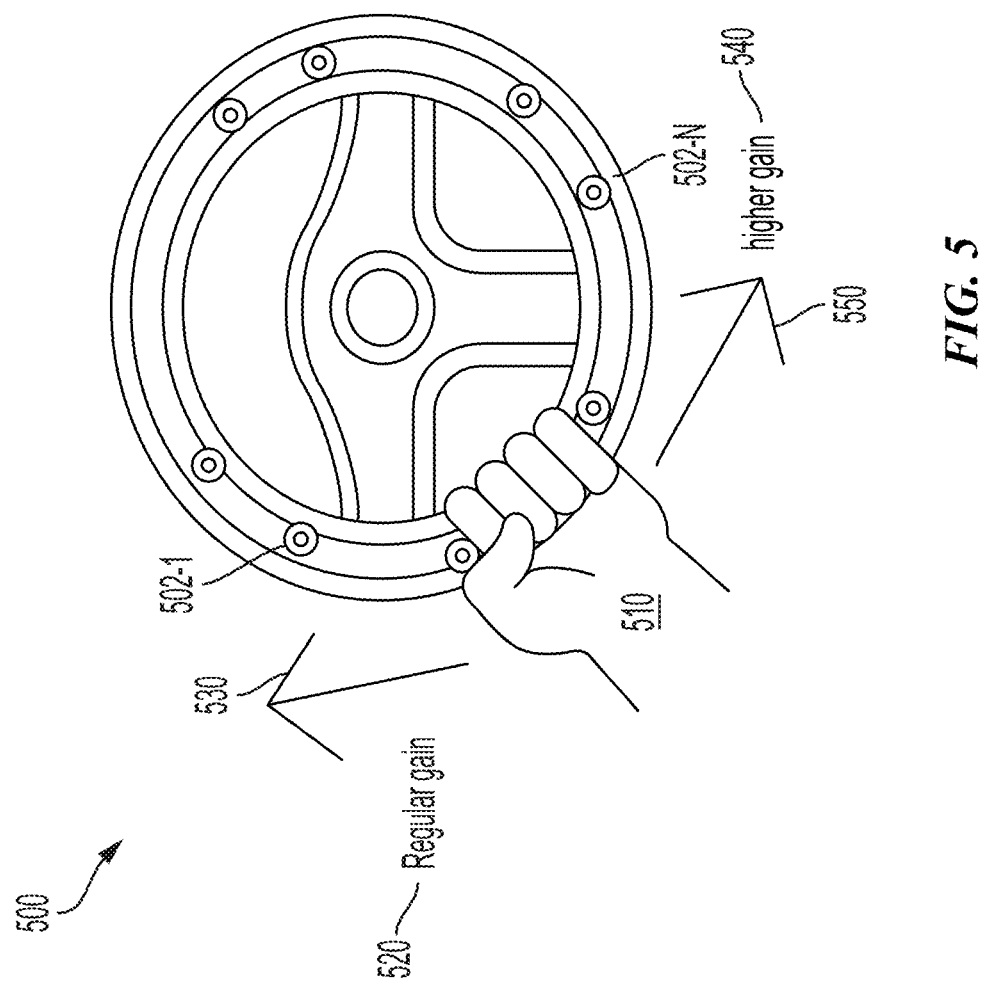
FIG. 5 illustrates torque provided to a steering wheel by a vehicle safety system during one-handed operation of a vehicle, according to aspects of the present disclosure.

FIG. 5 illustrates torque provided to a steering wheel by a vehicle safety system during one-handed operation of a vehicle, according to aspects of the present disclosure. As shown in FIG. 5, a steering wheel 500 is modulated to compensate for the physical limitations of the one-handed vehicle operation to enable assisted one-handed vehicle operation, according to aspects of the present disclosure. In some aspects of the present disclosure, a lateral control assistance module adjusts a steering assistance level when a driver is holding the steering wheel with only one hand (e.g., the left hand 510).

In these aspects of the present disclosure, a steering torque gain change module (e.g., the steering compensation adjustment module 318) may change the threshold for the lateral control assistance to activate earlier than when the vehicle operator is using both hands. For example, the lane keeping support module 312 may increase the steering torque gain for the direction that is harder to rotate for the hand in use to operate the vehicle. In this example, only a left hand 510 of the vehicle operator is on the steering wheel 500, which may be detected using steering wheel sensors 502 (502-1, . . . , 502-N). In response, the steering torque gain change module (e.g., the steering compensation adjustment module 318) increases the gain to provide higher gain 540 for rotating the steering wheel 500 in a counter-clockwise direction 550. By contrast, regular gain 520 is provided for rotating the steering wheel 500 in a clockwise direction 530.

In other aspects of the present disclosure, the steering compensation adjustment module 318 cancels the torque naturally applied to the steering wheel 500 due to resting of only one hand (e.g., the left hand 510) on the steering wheel 500. This naturally occurring torque may be canceled by applying a counter torque (e.g., the higher gain 540) to help sustain the one-handed position. For example, resting the left hand 510 at the 9 o'clock position on the steering wheel 500 naturally tends to rotate the steering wheel in the counter-clockwise direction 550 so that the left hand 510 rotates in the counter-clockwise direction 550 to a 6 o'clock position. This action forces the user to apply a counter torque to keep the steering wheel in the proper orientation so the hand can remain in the 9 o'clock position.

In these aspects of the present disclosure, the steering compensation adjustment module 318 applies a counter torque (e.g., the higher gain 540) to the steering wheel 500. The counter torque (e.g., the higher gain 540) enables the user to comfortably rest the user's left hand 510 without rotating the steering wheel 500. For example, a user driving with the user's left hand may naturally turn right, but may be impaired when turning left because of the body's limited ability to rotate the arm in that direction without letting go of the steering wheel. To compensate, the steering compensation adjustment module 318 may read the right turn input as it would normally, but would apply additional torque (e.g., the higher gain 540) on the steering wheel 500 during left turns to allow for a similar turn radius with the limited ability to turn the steering wheel 500. A method for facilitating one-handed operation of a vehicle by modulating a steering wheel to compensate for the physical limitations of the one-handed vehicle operation is shown in FIG. 6.

Figure 6:
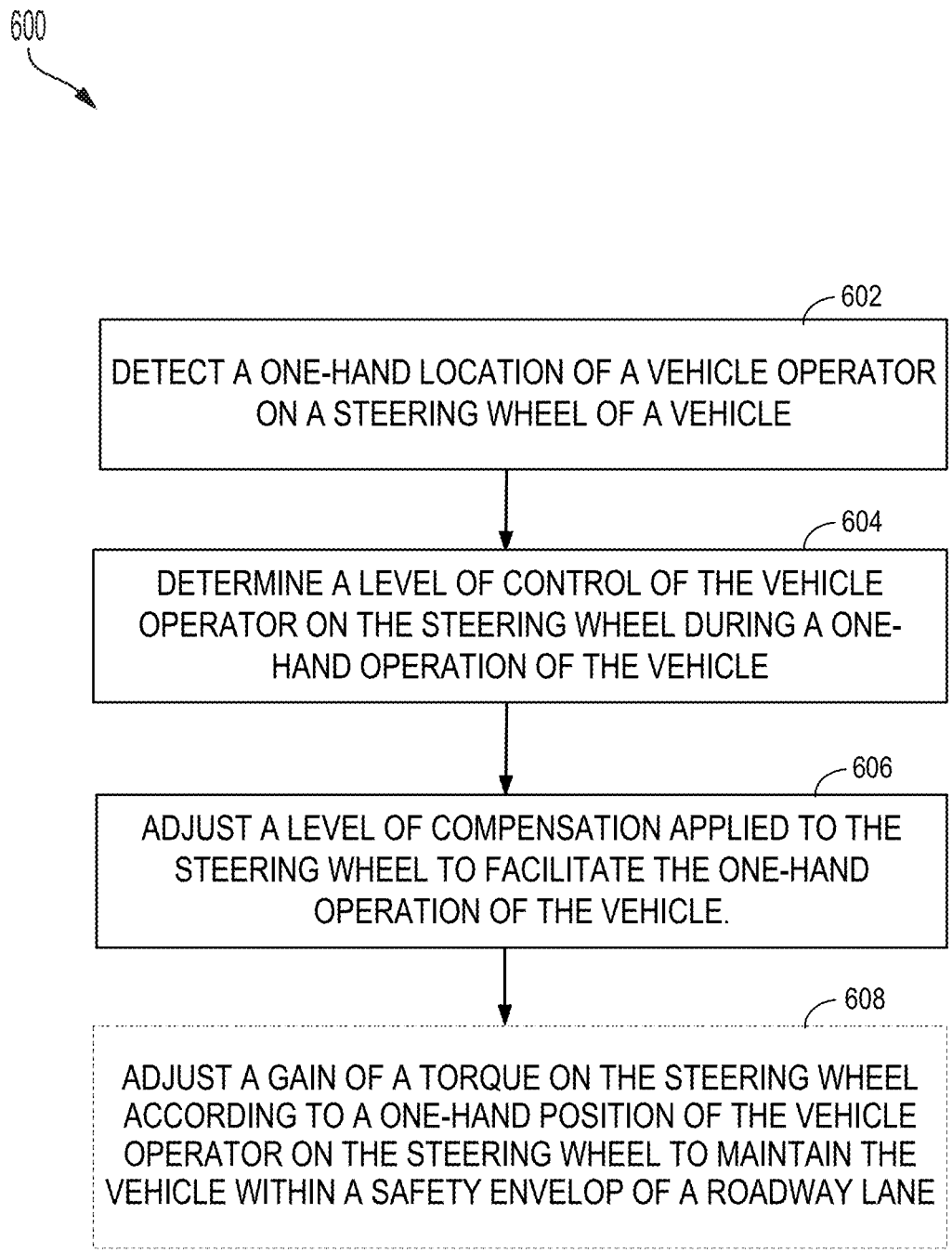
FIG. 6 is a flowchart illustrating a method of providing lateral assistance for enabling improved one-handed operation of a vehicle, according to aspects of the present disclosure.

FIG. 6 is a flowchart illustrating a method of providing lane keeping support for enabling improved one-hand operation of a vehicle, according to aspects of the present disclosure. A method 600 begins at block 602, in which a one-hand location of a vehicle operator is detected on a steering wheel of a vehicle. For example, as shown in FIG. 5, a left hand 510 of the vehicle operator is on the steering wheel 500, which may be detected using steering wheel sensors 502 (502-1, . . . , 502-N). At block 604, a level of control of the vehicle operator on the steering wheel is determined during a one-hand operation of the vehicle. For example, as shown in FIG. 5, resting the left hand 510 at the 9 o'clock position on the steering wheel 500 naturally tends to rotate the steering wheel in the counter-clockwise direction 550 so that the left hand 510 rotates in the counter-clockwise direction 550 to a 6 o'clock position. This action forces the user to apply a counter torque to keep the steering wheel in the proper orientation so the hand can remain in the 9 o'clock position, which is detrimental to the level of control.

At block 606, a level of compensation applied to the steering wheel is adjusted to facilitate the one-hand operation of the vehicle. For example, as shown in FIG. 5, a left hand 510 of the vehicle operator is on the steering wheel 500. In response, the steering torque gain change module (e.g., the steering compensation adjustment module 318) increases the gain to provide a higher gain 540 for rotating the steering wheel 500 in a counter-clockwise direction 550. By contrast, regular gain 520 is provided for rotating the steering wheel 500 in a clockwise direction 530. As shown in FIG. 5, the steering compensation adjustment module 318 may read the right turn input as it would normally, but would apply additional torque (e.g., the higher gain 540) on the steering wheel 500 during left turns to allow for a similar turn radius with the limited ability to turn the steering wheel 500.

At optional block 608, a gain of a torque on the steering wheel according to a one-hand position of the vehicle operator on the steering wheel is adjusted to maintain the vehicle within a safety envelope of the roadway lane. For example, as shown in FIG. 4, hand status sensors on the steering wheel of the vehicle 420 identify a location of the operator's hands from which the vehicle 420 can identify how to adjust a steering control assistance. For example, in the context of lane change assist and/or lane departure warning systems, the vehicle 420 may change thresholds to activate earlier, and/or increase the steering torque gain for a direction that is harder to control when using one hand, for example, as shown in FIG. 5.

In some aspects of the present disclosure, the method shown in FIG. 6 may be performed by the SOC 100 (FIG. 1) or the software architecture 200 (FIG. 2) of the vehicle 150. That is, each of the elements or methods may, for example, but without limitation, be performed by the SOC 100, the software architecture 200, the processor (e.g., CPU 102) and/or other components included therein of the vehicle 150, or the vehicle safety system 300.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc, where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for providing lane keeping support to enable improved one-hand operation of a vehicle, the method comprising:
   detecting one-hand operation of the vehicle;
   detecting a one-hand location of a vehicle operator on a steering wheel of the vehicle in response to the detected one-hand operation of the vehicle;
   determining a level of control of the vehicle operator on the steering wheel during the detected one-hand operation of the vehicle based on the detected one-hand location; and
   adjusting a level of compensation applied to the steering wheel based on the determined level of control to facilitate the detected one-hand operation of the vehicle.

2. The method of claim 1, in which adjusting the level of compensation comprises:
   determining a one-hand position of the vehicle operator on the steering wheel; and
   selectively modifying a torque applied to the steering wheel, asymmetrically with respect to a rotation direction of the steering.

3. The method of claim 2, in which selectively modifying the torque comprises applying a clockwise torque to the steering wheel when the one-hand position of the vehicle operator on the steering wheel is a left side of the steering wheel.

4. The method of claim 2, in which selectively modifying the torque comprises applying a counter-clockwise torque to the steering wheel when the one-hand position of the vehicle operator on the steering wheel is a right side of the steering wheel.

5. The method of claim 2, in which selectively modifying the torque comprises:
   detecting a turn by the vehicle operator; and
   applying a higher gain to the torque applied to the steering wheel according to the rotation direction of the turn by the vehicle operator.

6. The method of claim 5, in which applying further comprises applying a clockwise torque to the steering wheel in response to a right hand turn.

7. The method of claim 5, in which applying further comprises applying a counter-clockwise torque to the steering wheel in response to a left hand turn.

8. The method of claim 1, in which adjusting the level of compensation further comprises:

determining a left edge of a safety envelope to maintain the vehicle within a roadway lane;
determining a right edge of the safety envelope to maintain the vehicle within the roadway lane;
determining a torque to apply to the steering wheel to maintain the vehicle within the safety envelope of the roadway lane; and
adjusting a gain of the torque on the steering wheel according to a one-hand position of the vehicle operator on the steering wheel to maintain the vehicle within the safety envelope of the roadway lane.

9. A non-transitory computer-readable medium having program code recorded thereon for providing lane keeping support to enable improved one-hand operation of a vehicle, the program code being executed by a processor and comprising:
program code to detect one-hand operation of the vehicle;
program code to detect a one-hand location of a vehicle operator on a steering wheel of the vehicle in response to the detected one-hand operation of the vehicle;
program code to determine a level of control of the vehicle operator on the steering wheel during the detected one-hand operation of the vehicle based on the detected one-hand location; and
program code to adjust a level of compensation applied to the steering wheel based on the determined level of control to facilitate the detected one-hand operation of the vehicle.

10. The non-transitory computer-readable medium of claim 9, in which the program code to adjust the level of compensation comprises:
program code to determine a one-hand position of the vehicle operator on the steering wheel; and
program code to selectively modify a torque applied to the steering wheel, asymmetrically with respect to a rotation direction of the steering.

11. The non-transitory computer-readable medium of claim 10, in which the program code to selectively modify the torque comprises program code to apply a clockwise torque to the steering wheel when the one-hand position of the vehicle operator on the steering wheel is a left side of the steering wheel.

12. The non-transitory computer-readable medium of claim 10, in which the program code to selectively modify the torque comprises applying a counter-clockwise torque to the steering wheel when the one-hand position of the vehicle operator on the steering wheel is a right side of the steering wheel.

13. The non-transitory computer-readable medium of claim 10, in which the program code to selectively modify the torque comprises:
program code to detect a turn by the vehicle operator; and
program code to apply a higher gain to the torque applied to the steering wheel according to the rotation direction of the turn by the vehicle operator.

14. The non-transitory computer-readable medium of claim 13, in which the program code to apply further comprises program code to apply a clockwise torque to the steering wheel in response to a right hand turn.

15. The non-transitory computer-readable medium of claim 13, in which the program code to apply further comprises program code to apply a counter-clockwise torque to the steering wheel in response to a left hand turn.

16. The non-transitory computer-readable medium of claim 9, in which the program code to adjust the level of compensation further comprises:
program code to determine a left edge of a safety envelope to maintain the vehicle within a roadway lane;
program code to determine a right edge of the safety envelope to maintain the vehicle within the roadway lane;
program code to determine a torque to apply to the steering wheel to maintain the vehicle within the safety envelope of the roadway lane; and
program code to adjust a gain of the torque on the steering wheel according to a one-hand position of the vehicle operator on the steering wheel to maintain the vehicle within the safety envelope of the roadway lane.

17. A system for providing lane keeping support to enable improved one-hand operation of a vehicle, the system comprising:
a one-hand operation detection module to detect one-hand operation of the vehicle and to detect a one-hand location of a vehicle operator on a steering wheel of the vehicle in response to the detected one-hand operation of the vehicle;
a vehicle control level module to determine a level of control of the vehicle operator on the steering wheel during the detected one-hand operation of the vehicle based on the detected one-hand location; and
a steering compensation adjustment module to adjust a level of compensation applied to the steering wheel based on the determined level of control to facilitate the detected one-hand operation of the vehicle.

18. The system of claim 17, in which the steering compensation adjustment module is further to determine a one-hand position of the vehicle operator on the steering wheel, and to selectively modify a torque applied to the steering wheel, asymmetrically with respect to a rotation direction of the steering.

19. The system of claim 18, in which the steering compensation adjustment module is further to detect a turn by the vehicle operator, and to apply a higher gain to the torque applied to the steering wheel according to the rotation direction of the turn by the vehicle operator.

20. The system of claim 17, in which the steering compensation adjustment module is further to adjust a gain of a torque applied to the steering wheel by a lane keeping support module according to a one-hand position of the vehicle operator on the steering wheel to maintain the vehicle within a safety envelope of a roadway lane.

\* \* \* \* \*